United States Patent [19]

McGinley et al.

[11] Patent Number: 5,192,569
[45] Date of Patent: Mar. 9, 1993

[54] FAT-LIKE BULKING AGENT FOR AQUEOUS FOODS COMPRISING MICROCRYSTALLINE CELLULOSE AND A GALACTOMANNAN GUM

[75] Inventors: Emanuel J. McGinley, Morrisville; Domingo C. Tuason, Jr., Bensalem, both of Pa.

[73] Assignee: FMC Corporation, Philadephia, Pa.

[21] Appl. No.: 809,857

[22] Filed: Dec. 18, 1991

Related U.S. Application Data

[63] Continuation of Ser. No. 519,693, May 7, 1990, abandoned, which is a continuation-in-part of Ser. No. 359,065, May 26, 1989, abandoned.

[51] Int. Cl.$^5$ .................. A23L 1/0526; A23L 1/0534
[52] U.S. Cl. ..................................... 426/96; 426/99; 426/658; 426/804
[58] Field of Search ............... 426/96, 98, 99, 658, 426/804

[56] References Cited

U.S. PATENT DOCUMENTS

| | | | |
|---|---|---|---|
| 3,023,104 | 2/1962 | Battista . | |
| 3,539,365 | 11/1970 | Durand et al. | 106/197 |
| 3,573,058 | 3/1971 | Tiemstra | 426/658 |
| 4,263,334 | 4/1981 | McGinley | 426/523 |
| 4,734,287 | 3/1988 | Singer et al. | 126/41 |
| 4,911,446 | 3/1990 | Singer et al. | 426/658 |

FOREIGN PATENT DOCUMENTS 518961 10/1981 Australia .

OTHER PUBLICATIONS

FMC Corp Product Bulletin G-34, 1985.

*Primary Examiner*—Joseph Golian
*Assistant Examiner*—Evan Federman
*Attorney, Agent, or Firm*—Mark A. Greenfield; Stanford M. Back; Patrick C. Baker

[57] ABSTRACT

Microcrystalline cellulose intimately admixed with a galactomannan gum such as guar gum, in an aqueous medium and then dried, preferably by spray drying, forms a novel aggregate comprising a powder whose particles are spheroidal in shape. The resulting material may be used e.g., as a low-calorie fat-like material in certain foods. Optionally, a third, edible, component such as a lipophilic material, or a hydrophilic material, such as a proteinaceous material or a polysaccharide, or mixtures thereof, may be incorporated in this composition to enhance taste and/or other desired properties. When this composition, in colloidal form, is added to such foods as salad dressings or dairy products as a fat substitute, it imparts a fat-like mouth feel and consistency without the caloric value of fat. In a further embodiment of this invention it has been found that the spherical particles may be broken down under high energy shear conditions to form a fibrous material which, when dispersed in water, also imparts fat-like properties to foodstuffs.

37 Claims, No Drawings

FAT-LIKE BULKING AGENT FOR AQUEOUS FOODS COMPRISING MICROCRYSTALLINE CELLULOSE AND A GALACTOMANNAN GUM

This application is a continuation of application Ser. No. 07/519,693 filed May 7, 1990, now abandoned, which in turn is a continuation-in-part of application Ser. No. 07/359,065 filed May 26, 1989, now abandoned.

BACKGROUND OF THE INVENTION

This invention relates to a novel, non-nutritive, and/or ion-calorie water-dispersible fat-like bulking agent for aqueous-based food products. More particularly, this invention relates to a novel microcrystalline cellulose composition, methods for preparing the same, and foodstuffs containing said composition. Still more particularly, this invention relates to a substantially-spheroidal shaped particulate aggregate of microcrystalline cellulose (MCC) and a galactomannan gum (GG). The microcrystalline cellulose and galactomannan gum, when dried, form a novel composition which has a fat-like consistency, appearance and mouth feel when reconstituted in food. This material is a non-fat and therefore is useful to simulate the physical and organoleptic properties of fat dispersed in water when incorporated in such foods as salad dressings, dairy products such as frozen desserts and the like, where low calorie and/or low fat content is desirable. By the term "aggregate" is meant here a stable, substantially physical mixture of two or more components in its wet or dry state but which is more firmly bound when dried, yet remains intact if reconstituted in water under typical food processing conditions.

This composition, while particularly useful as a fat-like replacement in aqueous food products, may also be employed as a controlled release agent; a tabletting excipient; a flavor carrier; or as a bonding, bulking, or encapsulating agent.

In a further aspect of this invention, there is also provided a composition comprising the MCC-GG aggregate having adsorbed thereon lipophilic or hydrophilic materials such as proteinaceous materials, polysaccharides, or combinations thereof, which provide flavors and/or impart other desirable properties to the MCC-GG composition.

The use of MCC (also known in the prior art as "β-1,4-glucan") has been described in the art in association with other cellulosic materials such as carboxymethylcellulose (CMC), or with various gums and sweeteners and the like, to form a water-dispersible colloid for use as a stabilizing agent and to enhance the body and texture of certain types of foodstuffs. See, for example, U.S. Patents 3,539,365; and 4,263,334. The first patent describes a composition comprising MCC and CMC; the second patent describes a three-component composition comprising MCC, various hydrocolloid gums, and sweeteners. Food uses of MCC are generally described in U.S. Patent 3,023,104.

Each of these patents also describes known methods for preparing MCC in a form useful as food additive compositions.

Amongst the various hydrocolloid gums described in the 3-component compositions of U.S. Pat. No. 4,263,334 (above) are included guar gum, locust bean gum, gum arabic, sodium alginate, xanthan, gum karaya and the like. However, as this patent describes, except for CMC no one additive, including gums, gave fully satisfactory results as a dispersant in forming homogeneous colloidal dispersions unless both gum and sweetener were present.

Similarly, U.S. Pat. No. 3,539,365 directed to peptizing microcrystals, discloses (inter alia, col. 6, lines 6–12; col. 8, lines 50–53; and Table IV) that the compositions employing, e.g. guar gum, and the mixing methods of making the compositions, lead to the finding that only CMC (of a certain molecular weight) imparts all desired characteristics to MCC as a food additive.

U.S. Pat. No. 4,734,287, on the other hand, while disclosing a cellulose and gum combination, as in the above patents, further discloses the need for polyhydric alcohols to be present in the composition in order to make the resulting material palatable. Moreover, this patent is directed principally to simulating dietary fiber, and thus does not teach that the cellulose must be in a microcrystalline form, nor does it teach that the resulting product must necessarily be dried.

Also, U.S. Pat. No. 3,827,899 discloses a combination of microcrystalline cellulose and guar gum primarily as a stabilizer of pulp-containing soft drinks. However, this combination differs from the novel aggregates described below in that it is never dried to particulate form, and further it contains a carboxymethylcellulose as a necessary component of the composition.

U.S. Pat. Nos. 4,739,287 and 4,911,946 each show the use of various types of spherical particles as fat substitutes. U.S. Pat. No. 4,911,946, for example, teaches the use of microcolloidal carbohydrates within a certain micron range as cream-like substances for use in foods. Neither of these references, however, teaches the use of a stable, water-dispersible combination of microcrystalline cellulose and, e.g., guar gum, in the form of spherical particles, as further defined below, for use as a fat-like substance.

Indeed, it is well-known that guar gum, which had been sought after as a dispersant for colloidal MCC because of its water-absorbing capabilities and low cost is actually incompatible with MCC when admixed therewith in that it inhibits the peptization of MCC. Therefore, because guar gum, like other galactomannans, forms flocculates with MCC, it was supposed that these hydrocolloid gums would not be suitable in admixture with MCC as food stabilizers or the like. Thus, the art has discouraged the use of galactomannan gums, especially guar gum, as a traditional barrier or dispersant for MCC alone in food products despite its low cost and water-absorbing properties.

SUMMARY OF THE INVENTION

It has now been found in accordance with the present invention that when, under the conditions described below, microcrystalline cellulose is intimately admixed with a galactomannan gum, such as guar gum, to form a flocculate, and the flocculate dried, there is obtained, contrary to expectations, a highly useful MCC/galactomannan gum aggregate in particulate form, which particles are substantially spheroidal in shape, and which is thus particularly effective as a non-nutritive or low calorie, fat-like bulking agent for such foods as salad dressing, dairy products, such as ice cream, and the like, as well as for other uses. It has also been found that this aggregate, when reconstituted in water, not only remains intact under typical food processing conditions, but also that the particles become more spherical in shape, and obtain a more fat-like consistency.

In another aspect of this invention, there is provided the aforesaid composition optionally coated with a third component comprising a lipophilic or hydrophilic substance, wherein the latter includes both proteinaceous and polysaccharide materials, for the purpose of further enhancing the properties of said composition. This coating, which is generally an edible material, may be added simultaneously, or subsequent to, the formation of the MCC-GG product.

There is also provided herein various methods for preparing the water-dispersible composition in substantially spheroidal-shaped particulate form.

Thus, in accordance with one aspect of this invention, when MCC is intimately admixed with a galactomannan gum in an aqueous medium to form flocculates of controlled size, and the resulting slurry is dried, there is formed the powdered substance of this invention whose particles comprise MCC aggregated with the galactomannan gum in substantially spheroidal form.

In another aspect of this invention it has been found that when the wet flocculate is treated with an acid prior to drying, the shear-resistance of the resulting particles during any further food processing steps is significantly increased.

When this novel particulate material is reconstituted in water and incorporated in water-based foods, there is also obtained, in another aspect of this invention, an improved food composition, as further described below.

In preparing this novel aggregate it is necessary that the wet and dry end conditions under which it is prepared are controlled, in order to obtain a product having the desired characteristics for use as a fat-like bulking agent in food products, i.e., such conditions as rate of mixing to control the size and distribution of the flocculates, the ratios of MCC to GG, the particle shape of the resulting aggregate, and the like as described below, as well as the drying methods.

When thus prepared, there is obtained a substantially water-insoluble, yet water-dispersible aggregate of MCC and GG in powder form which is characterized in having particles which are substantially spheroidal in shape and which, when added to foodstuffs, are of a resilient consistency such as to impart an effective fat-like mouth feel and resistance to bite. This composition is further characterized in that it maintains these desirable properties when subjected to high energy shear, i.e. it is shear and heat resistant under typical food processing conditions, and retains its spheroidal shape when reconstituted in water.

By contrast, the not-yet dried flocculates of microcrystalline cellulose and guar gum, as for example those formed by the prior art, are completely unsuitable for use as fat-like substitutes in food because they are not spheroidal in shape, and cannot provide the necessary mouthfeel or consistency and the like provided by the composition of this invention.

While applicants do not wish to be bound by any particular theory, it is believed that the dried and reconstituted compositions of this invention are formed at least in part by the hydrogen-bonding of the gum to the MCC during the wet milling as well as during the drying steps of this process. It is also believed that what imparts the creamy, fat-like properties to the product is a combination of factors, viz., particle size, particle size distribution, the ratio of cellulose to gum, as well as the consistency and spheroidal shape of the resulting aggregate, particularly when it is reconstituted in an aqueous medium. That is to say, unexpectedly, the thus-formed aggregate maintains its spheroidal shape when reconstituted in water and does not disperse into its component parts under conventional food processing conditions which may include high energy shear processing. This is so despite the known affinity for, and water-absorbing property of, guar gum in water. Rather, the gum is believed to hydrate only slightly, forming a strong attraction for the cellulose, upon which it is adsorbed, thus maintaining the aggregate's fat-like consistency, in the food product to which it is added.

DETAILED DESCRIPTION OF THE INVENTION

The microcrystalline cellulose employed in this invention should desirably but not necessarily be of colloidal size, i.e., it may have an average particle size of about 0.1-100 microns, depending upon how the MCC is prepared, and preferably a particle size distribution such that not more than about 10-40% of the particles are over about 0.2-0.5 micron size. Particles of this size and distribution are obtained by conventional means, as for example by hydrolysis of the cellulose pulp, followed by wet mechanical disintegration.

The extraction and processing of the microcrystalline cellulose from wood pulp or fiber is well known in the art as described, for example, in U.S. Pat. Nos. 3,539,365 and 4,263,334 (above) which are incorporated herein by reference. For purposes of this process, the MCC can be in the form of a mechanically disintegrated aqueous slurry or wetcake having a solids content ranging from about 5 to 45% by weight, depending upon whether a high solids attrition is employed, e.g. about 30-45% solids, or a low solids, i.e. wet solids milling process (e.g. about 5-10% solids) known to the art is employed. See, for example, O. A. Battista, "Microcrystalline Polymer Science", pp. 39, 40, McGraw-Hill Book Co., (1975), and U.S. Pat. No. 2,978,446.

More specifically, the preparation of the forms of MCC which may be employed in this invention is described in FMC Corporation Bulletins L-0786 AAPS (1986) and G-34 (1985). As described therein, microcrystalline cellulose wetcake obtained from wood pulp which has been hydrolyzed with acid in a known manner may be simply spray-dried to produce a non-colloidal, powdered grade of cellulose (Avicel "PH" grade) or mechanically disintegrated to form a colloidal grade of cellulose (Avicel "RC/CL" grade, FMC Corporation). Depending upon how the cellulose wetcake is treated, if at all, the particle size of these various grades may range from about 0.1 to about 10 microns for the colloidal grade, and from about 10 to 100 microns for the non-colloidal grades. It will be understood that these ranges may overlap somewhat, and that the particle sizes, and particularly their lengths, will determine the size of the resulting MCC-GG aggregate.

A non-colloidal grade of MCC may be prepared, for example, by reslurrying the hydrolyzed cellulose wetcake with water, followed by spray drying to obtain an MCC powder having a particle size in the range of from about 10 to 100 microns, as described above.

Alternatively, the colloidal grades of MCC may be prepared by mechanically attriting the wetcake, directly after known hydrolysis, filtration, and washing steps, at which time additives such as barrier dispersants, e.g., sodium carboxymethylcellulose; and/or stabilizers, such as dried sweet whey or the like may be added if desired.

The attrited, colloidal MCC may then be dried, as for example in a spray dryer or bulk dryer. The colloidal MCC, as described above, generally has a particle size range of from about 0.1 to 10 microns, in which the particles, i.e. their length, are predominantly below about 1.0 micron.

The galactomannan gums employed herein are defined as carbohydrate polymers containing galactose and mannose, such as guar gum and locust bean gum. See, for instance, "Natural Gums For Edible Purposes", pages 17– 57, A. A. Lawrence, Noyes Data Corp., (1976). These commercially-available gums normally are employed in the form of powders of various viscosity ranges, or, if desired, in solution form, and may be added to the MCC in those forms for processing. Of these gums, guar gum is particularly preferred for purposes of this invention because of its greater water-absorbing properties and lesser cost than locust bean gum.

The weight ratio of MCC to gum should be such that the MCC comprises the predominant amount of the composition, while the gum should be present in intimate admixture therewith in an amount sufficient to cover and form a stable aggregate with the MCC and thus provide sufficient cover of the MCC particles to mask the characteristic taste of the cellulose. Thus, desirably the amount of MCC, by weight should be about 60-99%, more preferably about 70-95%, with the gum constituting the remainder, i.e., 40-1% by weight, preferably about 30-5%.

The processing of the MCC and GG to aggregated, particulate form in which the gum covers, i.e., is adsorbed on, the cellulose, is desirably carried out in an aqueous medium by forming an intimate mixture of the homogeneously dispersed MCC and gum under controlled agitation to obtain flocculated MCC-GG particles of desired size. This is accomplished by the use of high shear equipment such as Waring blenders, colloid mills, homogenizers, and the like. The solids content of this mixture may vary from about 1 to 60% by weight, based on the total weight of the aqueous mixture, depending upon the consistency needed for the subsequent drying method. In a typical procedure, the mixing is carried out until the desired size aggregate of the two components is obtained in the form of a slurry, generally at room temperature. Following this the slurry may, if necessary, be further sheared, as for example in a homogenizer, to obtain a uniform and homogeneous distribution of the aggregated components, just prior to the drying step. The resulting mixture is then co-dried, preferably by spray drying, to form an aggregate in powder form whose particles are generally spheroidal in shape, particularly when redispersed in water. As used herein, the term "dry" includes powdered aggregate which may contain up to a few percent of water which has been absorbed by the cellulose and/or gum.

As described briefly above, the wet flocculate may optionally be treated with an acid prior to drying in order to increase the resulting dry aggregate's shear resistance to disintegration during further processing, particularly when processed under high energy shear conditions. Acids which may be employed for this purpose include both inorganic and organic food grade acids such as phosphoric acid, citric acid, maleic acid, formic acid, and the like, of which phosphoric and citric acid are preferred.

The amount of acid employed is not critical, but should be an amount sufficient to impart more shear-resistance to the powdered aggregates, particularly when processed under high energy shear conditions. Generally, the amount of acid employed is enough to impart a pH of about 2.0-4.0, preferably 2.5-3.5, to the flocculate.

The particle size of this spheroidal aggregate, in dry form, should desirably be in the range of from about 0.1 to 100 microns, and preferably about 5 to 15 microns, when used as a fat-like substitute. In order to assure this particle size and shape when spray drying, the conditions should be regulated in a known manner, i.e. conditions which influence particle size and size distribution including method of atomization (nozzle, centrifugal types), rate of atomization (wheel speed, nozzle size, nozzle atomizing air pressure and the like), and slurry properties such as viscosity and its related solids content. For instance, the more dilute the slurry the smaller the resulting particle size and the narrower the particle size distribution. Those skilled in the art will also recognize that by varying in particular the nozzle size, and the pressure at which the homogenized slurry to be dried is pumped through the nozzle, the desired particle size will be obtained. The operating temperatures can be regulated by selecting optimal operating inlet and outlet temperatures. It will be recognized that these temperatures are not critical and can be varied substantially depending upon the properties of the slurry.

Alternatively, the MCC and GG in the form of wet-cake, may be dried in a fluid bed dryer and thereafter milled as many times as necessary to achieve the desired size, shape, and particle size distribution.

If the powdered particles obtained have an average particle size below about 5.0 microns, i.e., in the range of about 0.1-5.0 microns, it may be necessary to temporarily agglomerate them with a water-soluble hydrocolloid such as sodium carboxymethylcellulose to facilitate handling during processing; i.e., particles in this size range may behave like a gaseous stream or a very dusty powder if not agglomerated to a larger particle form. The amount of water-soluble hydrocolloid should be sufficient to achieve the desired agglomerate size to facilitate handling, desirably from about 5.0 to 45.0%, based on the combined weight of the spheroidal particles and the water-soluble hydrocolloid material.

A third component, which is generally an edible material, may optionally be incorporated in the MCC-GG composition to impart additional properties thereto. This component desirably is a lipophilic or hydrophilic material, wherein the latter material may include proteinaceous substances or polysaccharides, or combinations thereof. The third component is preferably added to the MCC-GG aggregate before it is dried, thereby forming an adsorption layer on the MCC-GG aggregate.

Among the lipophilic materials which may be employed are vegetable and animal fats, natural butterfat, and partially hydrogenated and hydrogenated products thereof. These materials may be added for the purpose of modifying the surface characteristics of the MCC-GG aggregate by creating the flavor and taste sensation of fat. This may be accomplished by forming a thin layer of lipophilic coating on the MCC-GG aggregate to produce substantially insoluble spheroidal particles with flavor and taste characteristics more closely associated with fats. Desirably these lipophilic substances are initially emulsified, for example with a surface active material, in order to be effectively adsorbed on the MCC-GG and added, with agitation, to an aqueous slurry of the aggregate to form a uniform mixture which may then be dried. The surface active material desirably is used in amounts of about 3.0 to 4.0, preferably about 3.5, percent by weight of the lipophilic material and includes such synthetic and natural hydrophilic and lipophilic emulsifiers as distilled monoglycerides, ethoxylated monoglycerides, mono-and di-glycerides, lecithin, polyoxyethylene sorbitan monoesters such as polyethylene sorbitan monostearate, and the like. To satisfactorily dry this composition, however, preferably by spray drying, a proteinaceous material should also desirably be employed in order to encapsulate the oil-coated MCC-GG aggregate and obtain effective recovery of the dried powder. This proteinaceous material, which may be added to the slurry before drying, typically comprises about 5-100% by weight, preferably about 40-100%, based on the weight of the lipophilic material. A preferred proteinaceous material is sodium caseinate. Other suitable proteinaceous materials include whey, milk solids, egg albumin, vegetable protein or mixtures thereof. Where desired, these proteinaceous materials may be employed as the sole coating, or in combination with other non-lipophilic materials, of the MCC-GG aggregate for use in known food formulations.

Polysaccharides, which may be of natural or synthetic origin, may also be employed for purposes of modifying the surface characteristics e.g., as stabilizers, and enhancing the taste of the reconstituted food product, as for example maltodextrin, corn syrup, carrageenan, sodium carboxymethylcellulose, xanthan gum, gum tragacanth, sodium alginate, high and low methoxyl pectins, gum agar, gum karaya, gum arabic, or any mixtures thereof. Also, monosaccharides such as dextrose and fructose may be used for this purpose.

These added third components may be incorporated in the composition by adsorption on the MCC-GG particles in amounts sufficient to cover their surface, and provide desired organoleptic and physical characteristics, as for example from about 5 to 45%, preferably about 10 to 30%, based on the total weight of the composition, i.e., the aggregate plus the third component. If desired, selected combinations of these added components may be employed. In one method of preparation, this composition of aggregate and third component may readily be formed by simultaneously admixing an aqueous slurry containing the MCC, GG and third component, drying the mixture, and recovering the aggregate with the lipophilic or hydrophilic material adsorbed thereon. Alternatively, the aggregate may be formed separately, followed by coating with a third component. This method is more desirably employed with hydrophilic components, particularly where it is desired to first reduce the aggregate particle size, followed by covering it with a selected surface coating, and then drying the resulting composition.

The compositions of this invention are readily incorporated in the desired foodstuffs, such as salad dressings or dairy products, by various means. In general, it is preferred to disperse the particulate composition (as a powder) in water to form an aqueous dispersion which is then processed with the foodstuffs by conventional food processing, i.e., mixing means. When thus reconstituted in water, the particle size is in the range of from about 0.1 to 100 microns, and preferably about 5-15 microns. The resulting dispersion may, for example, comprise an aqueous medium having mixed therein a sufficient amount of MCC-GG aggregate to provide the desired fat-like or related properties, generally from about 1.0 to 50.0% by weight of the aqueous dispersion. Lower ranges of from about 1.0 to 15.0% may also be employed when a third component is present.

The amount of aqueous MCC-GG-containing dispersion which may be incorporated in a given foodstuff is not critical and can be varied considerably. Generally, the amount of dispersion employed should be sufficient to provide the foodstuff with the desired fat-like characteristics, including mouth-feel, bulk, consistency and the like. Thus, foodstuffs may contain as little as about 1% of MCC-GG aggregate solids content, based on the total weight of the food composition, or as much as about 50%, and desirably about 2-20%. When a third component is adsorbed on this MCC-GG aggregate, a lower range of from about 2-10% is preferred. For example, salad dressings may desirably contain from about 4 to 12% of MCC-GG in the final formulation, while dairy products such as frozen desserts may contain from about 2 to 12% of the aggregate.

Other foodstuffs which may advantageously be improved by this invention include candies, frostings, gravies, margarines, mayonnaise, meat and vegetable fillings, puddings, sauces, soups, spreads, and like water-based foods.

If necessary, the MCC-GG composition added to the foodstuff can be stabilized in the food to avoid separation or the like by including in the final processing step such known stabilizers as xanthan gum or sodium carboxymethylcellulose.

In another embodiment of this invention, it has been found that if desired the aforedescribed MCC-GG spherical aggregate, with or without a third component, and having an elevated gum content relative to the microcrystalline cellulose, may be further converted under high energy shear conditions to a water-dispersible, water-stable, very fine fibrous material which, when dispersed in water, is equally useful as a fat-like substance in aqueous-based foodstuffs.

By the term "elevated gum content", preferably guar gum, is meant those weight ratios of MCC to gum wherein the MCC still predominates but wherein the amount by weight of gum in the spherical particles is in the range of about 15-40% based on the total weight of the MCC-GG particulate aggregate, preferably about 15-30%, with the MCC comprising the remainder, i.e. about 60-85%, preferably about 70-85%. Conversely, where the gum content is in the lower range of about 1-15% and the MCC is in the range of about 85-99%, the spherical particles essentially retain their original shape, i.e., they are more highly shear-resistant.

By the term "high energy shear conditions" is meant generally those food processing conditions which will convert the spherical MCC-GG particles having the elevated gum ratios described above to very fine, fibrous, gum-coated MCC particles. These high energy shear conditions are those conventionally employed in the partial freezing of frozen dessert mixes such as ice cream, or in the preparation of baking jellies and the like. For example, high energy shear conditions are those which may be obtained with a Waring blender operated at about a rheostat setting of about 100 (about 16,000 rpm) for 15 minutes; or by repeated processing through colloid mills for extended periods, e.g. 30 minutes at a 10 mil clearance; or by the use of homogenizers at high pressure, e.g. at about 6000 psi.

The process of converting the spherical aggregates to fibrous material in accordance with this aspect of the invention is desirably carried out by subjecting the spherical particles to the high shear conditions in an aqueous medium in which the weight percent of the spherical particles constitutes from about 1 to 20% of the total aqueous dispersion, preferably from about 2 to 10%, in order to optimize the shearing effect. These ranges are not critical and may be varied depending upon the size of the fibrous particles desired, the viscosity of the dispersion, and the type of shearing equipment employed, typically a Waring blender.

The resulting fibrous material is characterized in being a very fine, fibrous, GG-coated MCC particle in aggregate form wherein the weight ratio of MCC to GG is essentially the same as that of the starting spherical particles, i.e. about 60-85% by weight of MCC to about 40-15% of gum.

The size of the resulting fibrous particles may vary somewhat depending upon the high energy shear conditions employed. For example when a 4 wt. % aqueous dispersion of an 85:15 wt. % ratio of MCC:guar gum spherical particles was subjected to a high energy shear condition in a Waring blender, the resulting fiber particle sizes ; ranged from about 0.5-30 microns, with a median size of between about 4-5 microns, with 99% of the particles being below about 30 microns, 72% below 10 microns, 51% below about 5 microns, and 16% below about 1 micron. Thus, the fibrous particle size range is desirably about 0.5-30 microns (maximum dimension) and preferably about 1-10 microns.

The same hydrophilic or lipophilic materials may be employed as third components in the same amounts and for the same purposes as described above in connection with the spherical particles, in order to obtain enhanced taste or like properties in the final product, i.e. about 5-45% by weight of the total composition. Also consistent with the properties of the spherical particle materials from which the fibrous particles are obtained, this latter material, when dispersed in an aqueous medium, is likewise effective as a non-nutritive fat-like bulking agent for water-based foods such as salad dressings, dairy products such as ice-cream, and the like, which material also simulates the physical and organoleptic properties of fat dispersed in water.

When reconstituted in water, the fibrous MCC-GG material desirably constitutes from about 1-50% by weight of the aqueous dispersion, although lower ranges of from about 1-15% are preferred. As in the case of the spherical particle aggregates, the amount of aqueous dispersion incorporated in any foodstuff is not critical and can be varied in accordance with the needs of the food formulator. For example, dispersions in amounts sufficient to provide an MCC-GG fiber solids content of from about 1-40%, preferably about 2-15%, based on the total weight of the food composition, may be employed.

The invention will now be illustrated by the following examples, of which Examples 1-4 illustrate one aspect of the invention, while Examples 5 and 6 are comparative examples. That is to say, Example 5 shows that the level of guar in the processed powder is not sufficient to provide the necessary taste-masking of the cellulose, while Example 6 illustrates problems encountered with excessive levels of guar relative to processing, i.e. drying the powder. Examples 7 and 8 illustrate one method of treating the MCC-GG flocculate with an acid prior to drying it, in order to increase the high energy shear resistance of the dried product. Example 9 demonstrates the further embodiment of subjecting the spherical particles having an increased amount of gum relative to the microcrystalline cellulose to high energy shear conditions to provide the MCC-GG particulate aggregate in fibrous particle form; Example 10 illustrates one highly useful application of this fibrous material in a frozen dessert formulation.

EXAMPLE 1

Attrited microcrystalline cellulose wetcake (1,022.73 g), obtained from hydrolyzed wood pulp, having a particle size range of from 0.1 to 10.0 microns, 50% of which has a particle size range below 0.2 microns, and with a solids content ranging from about 38-44%, is initially dispersed for 15 minutes in 11,424.30 g of distilled water in a colloid mill set at 40 mil clearance with the rotor operating at a rheostat setting of 120 (about 20,000 rpm). Guar gum No. 60-70, 52.97 g, (5.6% moisture), obtained from MultiKem Corp., of New Jersey, is added to obtain the desired microcrystalline cellulose to guar gum solids weight ratio (about 90:10) and mixed for another 30 minutes in the colloids mill set at 10 mil clearance with a rotor operating at the 120 setting. The resulting slurry is passed through a Manton Gaulin homogenizer at 6,000 psi and spray dried to form a powder. The spray drying is performed as follows: The homogenized slurry is fed to a 3 foot Bowen spray dryer utilizing nozzle atomization 0.1 inch opening. The slurry is fed to the dryer by means of a variable feed Moyno pump at a rate to provide the desired outlet temperature. The operating inlet/outlet air temperature of the spray dryer is about 175° C. and 95° C., respectively. A substantially water-insoluble, spheroidal cellulose/galactomannan powder is produced which retains its shape in water on application of mechanical shear normally encountered in conventional food processing operations. This powder is characterized in having a moisture content of 2.8%; a bulk density of 35.7 lbs/ft$^3$; and a particle size range of from 5 to 70 microns.

EXAMPLE 2

Attrited microcrystalline cellulose wetcake of Example 1, (965.91 g) with a solids content in the range of 38-44%, is initially dispersed for 15 minutes in 11,454.64 g of distilled water in a colloid mill set at 40 mil clearance with the rotor operating at a rheostat setting of 120 (about 20,000 rpm). The guar gum No. 60-70, 79.45 g, (5.6% moisture) of Example 1 is added to obtain the desired microcrystalline cellulose to guar gum solids weight ratio (about 85:15) and mixed for another 30 minutes in the colloid mill set at 10 mil clearance with the rotor operating at the 120 setting. The resulting slurry is passed through a Manton Gaulin homogenizer at 6,000 psi and spray dried to form a powder. The spray drying is performed as follows: The homogenized slurry is fed to a 3 foot Bowen spray dryer utilizing nozzle atomization 0.1 inch opening at 90 psi atomizing air pressure. The slurry is fed to the dryer by means of a variable feed Moyno pump at a rate to provide the desired outlet temperature. The operating inlet/outlet air temperature of the spray dryer is about 200° C. and 110° C., respectively.

When the resulting spray dried powder, in the amount of 4% by weight of finished dressing product, is mixed with other ingredients as prescribed, there is obtained a salad dressing of the following formulation:

| No-oil salad dressing | |
| --- | --- |
| Ingredients | Amount (Wt %) |
| Water | 59.45 |
| Vinegar (white distilled, 50 grain) | 20.00 |
| Sugar | 12.00 |
| Tomato paste (26% solids) | 2.00 |
| Cellulose/guar gum powder | 4.00 |
| Salt | 1.50 |
| Mustard powder | 0.45 |
| Xanthan gum | 0.35 |
| Oleoresin paprika | 0.10 |
| Onion powder | 0.10 |
| Garlic powder | 0.03 |
| Sodium benzoate | 0.02 |
| | 100.00 |

The no-oil salad dressing product prepared with the resulting spray-dried cellulose/guar gum powder of this example has a fat-like rich texture and consistency similar to that obtained from pourable oil-based dressings.

The spray dried powder of this example, in the amount of 4.0% by weight of the final product, is also evaluated in a low fat, low total solids aspartame-sweetened frozen dessert system. The frozen dessert product is prepared in accordance with the following this formulation:

| Ingredients | Grams |
| --- | --- |
| Skim milk | 2,369.15 |
| Whole milk | 500.00 |
| MSNF[1] | 128.35 |
| Sorbitol | 350.00 |
| Aspartame | 1.65 |
| Cellulose/guar gum powder | 140.00 |
| CMC-7MF[2] | 8.75 |
| Carrageenan | 0.35 |
| (4:1) Mono-diglycerides/ Polysorbate 80[3] | 1.75 |
| | 3,500.00 |

[1] milk solids - nonfat
[2] a medium viscosity carboxymethylcellulose
[3] polyoxyethylene (20) sorbitan monooleate (ICI)

The above low-fat aspartame-sweetened frozen dessert product (with approximately about 0.5% butterfat) prepared with the spray dried cellulose/guar gum powder exhibits a smooth and creamy fat-like textural quality similar to that prepared from a conventional 4% butterfat ice milk.

EXAMPLE 3

As described in detail below, if optional ingredients such as a lipophilic material are desired for sake of modifying the surface characteristics of the MCC-guar spheroids, the lipophilic material must be initially emulsified for effective adsorption onto and around the cellulose/galactomannan aggregates to produce insoluble spherical particles with flavor and taste characteristics more closely associated with fats. To form such a blend, the lipophilic material, i.e. a hydrogenated fat, and a surface active material are combined by heating the mixture to melt the hydrogenated fat. The fat/surfactant blend, which has been emulsified in water, is then added to the microcrystalline cellulose/guar gum flocculate and the final mixture homogenized prior to drying.

Attrited microcrystalline cellulose wetcake of Example 1, (900.60 g) having a solids content in the range of 38-44%, is initially dispersed for 15 minutes in 11,470.61 g of distilled water in a colloid mill set at 40 mil clearance with the rotor operating at a rheostat setting of 120 (about 20,000 rpm). Guar gum No. 60-70, 71-78 g, (7.0% moisture), as in Example 1, is added to obtain the desired microcrystalline cellulose to guar gum solids weight ratio (about 85:15) and mixed for another 30 minutes in the colloid mill set at 10 mil clearance with the rotor operating at the 120 setting. The resulting slurry is transferred to a Groen steam jacketed kettle and heated to 180° F. A hydrogenated fat, 50 g, (Paramount B; Durkee Food Co.) and Polysorbate 60 (polyethylene (20) sorbitan monostearate (ICI), 1.8 g, are combined by heating the fat/emulsifier mixture to a temperature sufficient to melt the hydrogenated fat. The fat/emulsifier blend is then added to the microcrystalline cellulose/guar gum slurry and mixed for 30 minutes at 180° F. Sodium caseinate, 5.21 g (4.0% moisture) is added and mixed for another 15 minutes. The resulting emulsion is passed through a Manton Gaulin homogenizer at 5500 psi first stage, 500 psi second stage and spray dried to form a powder.

The spray drying is performed as follows: The homogenized slurry is fed to a 3 foot Bowen spray dryer utilizing nozzle atomization 0.1 inch opening. The slurry is fed to the dryer by means of a variable feed Moyno pump at a rate to provide the desired outlet temperature. The operating inlet/outlet air temperature of the spray dryer is about 150° C. and 95° C., respectively.

With moderate agitation, the lipo-coated, spray dried MCC-GG powder produced is cold water dispersible, providing substantially spheroidal particles when redispersed in water.

When the spray dried powder in the amount of 4.0% by weight of finished product is mixed with other ingredients as prescribed in a salad dressing, there is obtained the following formulation:

| Low calorie salad dressing | |
| --- | --- |
| Ingredients | Amount (Wt %) |
| Water | 59.45 |
| Vinegar (white distilled, 50 grain) | 20.00 |
| Sugar | 12.00 |
| Tomato paste (26% solids) | 2.00 |
| Lipo-coated cellulose/guar gum powder | 4.00 |
| Salt | 1.50 |
| Mustard powder | 0.45 |
| Xanthan gum | 0.35 |
| Oleoresin paprika | 0.10 |
| Onion powder | 0.10 |
| Garlic powder | 0.03 |
| Sodium benzoate | 0.02 |
| | 100.00 |

The salad dressing product (containing only 0.4% fat) prepared with the spray dried cellulose-guar gum powder of this invention has a fat-like rich texture and consistency similar to those obtained from pourable 12% oil-based dressings.

EXAMPLE 4

The resulting spray dried powder (3.2% moisture) of Example 1, (154.96 g) is redispersed in 3,738 g distilled water and mixed for 15 minutes with moderate agitation. Medium viscosity sodium carboxymethyl cellulose, 27.63 g, (4.2% moisture) is added and mixed for another 30 minutes. The resulting slurry is passed through a Manton Gaulin homogenizer at 6,000 psi and spray dried to form a powder. The spray drying is performed as follows: The homogenized slurry is fed to a 3 foot Bowen spray dryer utilizing nozzle atomization 0.1 inch opening. The slurry is fed to the dryer by means of a variable feed Moyno pump at a rate to provide the desired outlet temperature. The operating inlet/outlet air temperature of the spray dryer is about 200° C. and 110° C. respectively.

The spray dried powder agglomerate produced (having a particle size of about 30-100 microns exhibits fully dispersed cellulose/guar gum spheroids, after reconstitution in water, having an average particle size of about 5-30 microns when rehydrated with moderate agitation. After overnight storage, the cellulose/guar gum dispersion shows good stability, thus resembling the redispersibility and stability properties of spray dried colloidal microcrystalline cellulose products.

EXAMPLE 5

Attrited microcrystalline cellulose wetcake of Example 1, (1,672 g) having a solids content ranging from 38-44% is initially dispersed for 15 minutes in 11,070 g of distilled water in a colloid mill set at 40 mil clearance with the rotor operating at a rheostat setting of 120 (about 20,000 rpm). Guar gum No. 60-70 (5.6% moisture) of Example 1, 31 g, is added to obtain the desired microcrystalline cellulose to guar gum solids weight ratio (96:4) and mixed for another 30 minutes in the colloid mill set at 10 mil clearance with the rotor operating at the 120 setting. The resulting slurry is passed through a Manton Gaulin homogenizer at 6,000 psi and spray dried to form a powder. The spray drying is performed as follows: the homogenized slurry was fed to a 3 foot Bowen spray dryer utilizing nozzle atomization 0.1 inch opening. The slurry is fed to the dryer by means of a variable feed Moyno pump at a rate to provide the desired outlet temperature. The operating inlet/ outlet air temperature of the spray dryer is about 175° C. and 95° C. respectively.

When taste tested, the aqueous gel system produced from the spray dried powder imparts a somewhat gritty, chalky mouthfeel, characteristic of the cellulose still present, making it organoleptically unacceptable.

EXAMPLE 6

Attrited microcrystalline cellulose wetcake of Example 1, (448 g) having a solids content ranging 38-44% is initially dispersed for 15 minutes in 11,525 g of distilled water in a colloid mill set at 40 mil clearance with the rotor operating at a rheostat setting of 120 (about 20,000 rpm).. Guar gum No. 60-70 (5.6% moisture) of Example 1, 133 g, is added to obtain the desired microcrystalline cellulose to guar gum solids weight ratio (60:40) and mixed for another 30 minutes in the colloid mill set at 10 mil clearance with the rotor operating at the 120 setting. The resulting slurry is passed through a Manton Gaulin homogenizer at 6,000 psi and it is attempted to spray dry the slurry to form a powder.

Spray drying this slurry at the various operating conditions employed in the above examples does not result in a dry powder. The difficulty in drying this slurry appears related to guar gum's water-absorbing properties which have a strong tendency to hold on to the water phase. Consequently, the slurry is not converted to a usable form, i.e., a dry powder; rather it coats the drying wall chamber as wet layers of wall deposits having uncertain properties.

EXAMPLE 7

In accordance with the general procedures and starting materials of Example 1, 988.37 g of attrited microcrystalline cellulose wetcake with a solids content ranging 38-44% is initially dispersed in 11,430.98 g of distilled water in a colloid mill set at 40 mil clearance with the rotor operating at a rheostat setting of 90 (about 15,000 rpm). Phosphoric acid (85% $H_3PO_4$) (5.0 g) is added and mixed for 3 minutes. Guar gum 60-70 (7.0% moisture) (80.65 g) is added to obtain the desired microcrystalline cellulose to guar gum solids ratio (about 85:15) and mixed for another 30 minutes in the colloid mill set at 10 mil clearance with the rotor operating at the 90 setting. The resulting slurry with a pH of 2.5 is passed through a Manton Gaulin homogenizer at 2,500 psi and spray dried to form a powder. The spray drying is performed as follows: The homogenized slurry is fed to a 3 foot (0.9144 m) Bowen spray dryer utilizing a nozzle atomization 0.1 inch (0.00254 m) opening. The slurry is fed to the dryer by means of a variable feed Moyno pump at a rate to provide the desired outlet temperature. The operating inlet/outlet air temperature of the spray dryer is about 225° C./145° C. The spray drying conditions are regulated depending upon feed properties such as viscosity and resulting dried product characteristics and subsequent yield.

An insoluble cellulose/galactomannan powder with a somewhat spherical shape is produced. A 4% aqueous dispersion of the experimental powder is mixed in a Waring blender and characterized for the spherical aggregates' shear resistance. After shearing for 15 minutes (100 rpm) in a Waring blender, the acid-treated MCC/guar aggregates retain their spherical shape integrity.

EXAMPLE 8

In accordance with the general procedures of Example 7, except that a third component, xanthan gum, is included, 938.95 g of attrited microcrystalline cellulose wetcake with a solids content ranging 38-44% is initially dispersed in 11,456.97 g of distilled water in a colloid mill set at 40 mil clearance with the rotor operating at a rheostat setting of 90 (about 150,000 rpm). Phosphoric acid (85% $H_3PO_4$) (5.0 g) is added and mixed for 3 minutes. Guar gum 60-70 (7.0% moisture) (76.61 g) is added to obtain the desired microcrystalline cellulose to guar gum solids ratio and mixed for another 30 minutes in the colloid mill set at 10 mil clearance with the rotor operating at the 90 setting. Xanthan gum (9.0% moisture) (27.47 g) is added to obtain the desired microcrystalline cellulose/guar gum to xanthan gum solids ratio and mixed for another 30 minutes in the colloid mill. The resulting slurry with a pH of 3.3 is passed through a Manton Gaulin homogenizer at 2,500 psi and spray dried to form a powder. The spray drying is performed as follows: The homogenized slurry is fed to a 3 foot (0.9144 m) Bowen spray dryer utilizing a nozzle atomization 0.1 inch (0.00254 m) opening at 90 psi atomizing air pressure. The slurry is fed to the dryer by means of a variable feed Moyno pump at a rate to provide the desired outlet temperature. The operating inlet/outlet air temperature of the spray dryer is about 225° C./145° C. The spray drying conditions are regulated depending upon feed properties such as viscosity and resulting dried product characteristics and subsequent yield.

The spray-dried powder produced exhibits fully dispersed spheroidal cellulose/galactomannan particles when reconstituted at 4.0% concentration with moderate agitation. After overnight storage, the cellulose/galactomannan dispersion shows good stability, thus resembling the redispersibility/stability properties of spray dried colloidal MCC/CMC products (Avicel RC or Avicel Cl; FMC Corp.).

When sheared in a Waring blender rheostat setting of 100=about 16,000 rpm, the acid-treated cellulose/guar gum spherical aggregates maintain their shape after 15 minutes mixing.

EXAMPLE 9

In accordance generally with the procedures and starting materials of Example 2, 141.00 lbs. of attrited microcrystalline cellulose wetcake with a solids content ranging 38-44% is initially dispersed in 191.5 gals. of deionized water in a 400 gal. mixing tank. This is passed through a colloid mill (Tekmar Disdax Reactor-D.R. 3/6/6) (5 H.P.), to obtain a uniform dispersion of the cellulose particles before the addition of guar gum. Guar gum FG 60-70 (9.7% moisture) (11.63 lbs.) is added and the slurry mixed for 30 minutes. The slurry is passed through the colloid mill two (2) times prior to homogenization. The slurry is homogenized through a Manton Gaulin homogenizer at 2,500 psi and spray dried to form a powder. The spray drying is performed as follows: The homogenized slurry is fed to an 8 foot (2.4384 m) Bowen spray dryer utilizing disc atomization operating at 20,776 rpm. The slurry is fed to the dryer by means of a variable feed Moyno pump at 0.67 gallons per minute. The operating inlet/outlet air temperature of the spray dryer is about 400°-435° F. and an outlet temperature range of 230°-260° F.

Reconstitution of the powder in water by means of moderate agitation shows spherical aggregates of cellulose/guar gum. When sheared under high shearing conditions (Waring blender-rheostat setting of 100=about 16,000 rpm), the cellulose/guar gum aggregates show some degree of particulate breakdown after 5 minutes of mixing, and lose most of their spherical shape integrity by being reduced into very fine, fibrous particles with prolonged shearing after 15 minutes.

EXAMPLE 10

The spray-dried powder aggregates of Example 9 are evaluated in a nonfat frozen dessert system. The frozen dessert product is prepared in accordance with the following formulation:

| Ingredients | Grams |
| --- | --- |
| Skim milk | 2,590.38 |
| MSNF[1] | 221.87 |
| Sugar | 420.00 |
| Corn Syrup, 80% solids | 218.75 |
| Cellulose/galactomannan powder | 43.75 |
| CMC-7MF[2] | 5.25 |
| | 3,500.00 |

[1]MSNF — milk solids - non-fat
[2]CMC-7MF — a medium viscosity carboxymethylcellulose The above nonfat frozen dessert product prepared with the spray dried cellulose/galactomannan powder of this invention at 1.25% by weight of the frozen dessert exhibits smooth and creamy fat-like textural qualities similar to that prepared from a conventional 4% butterfat ice milk after initial and successive freeze/thaw cycles.

We claim:

1. A composition comprising dry, water-dispersible, water-stable, substantially spheroidal-shaped particles having an average particle size in the range of about 0.1-100 microns, each particle consisting essentially of an aggregate of about 60-99% by weight of microcrystalline cellulose and about 40-1% by weight of a galactomannan gum, which aggregate remains impact if dispersed in an aqueous medium.

2. The composition of claim 1 wherein the amount of the microcrystalline cellulose is about 70% by weight and the amount of the galactomannan gum is about 30% by weight, each based on the total weight of the composition.

3. The composition of claim 1 wherein the microcrystalline cellulose is of colloidal size.

4. The composition of claim 1 wherein the galactomannan gum is guar gum or locust bean gum.

5. The composition of claim 1 having a particle size of about 5-15 microns.

6. A composition comprising an aqueous medium having blended therein about 1.0-50.0 weight % of the composition of claim 1.

7. A process for preparing the composition of claim 1, comprising forming an intimate mixture consisting essentially of microcrystalline cellulose and a galactomannan gum in an aqueous medium under controlled agitation, drying the resulting flocculate, and recovering water-dispersible particles having a substantially spheroidal shape.

8. The process of claim 7 wherein the resulting flocculate is spray dried.

9. The process of claim 7 further comprising treating the mixture with a food grade acid prior to drying the resulting flocculate, the acid being present in amounts sufficient to impart increased high energy shear resistance to the spheroidal particles.

10. The process of claim 7 wherein the acid is selected from phosphoric acid, citric acid, maleic acid and formic acid.

11. The process of claim 7 wherein the amount of acid is sufficient to provide a pH of about 2.0 to 4.0.

12. The composition of claim 1 having adsorbed on the aggregate of microcrystalline cellulose and galactomannan gum a lipophilic or hydrophilic material, or combinations thereof.

13. The Composition of claim 12 wherein the lipophilic material is selected from the group consisting of vegetable and animal fats, partially hydrogenated and hydrogenated products thereof, or mixtures thereof.

14. The composition of claim 12 wherein the hydrophilic material is a proteinaceous material selected from the group consisting of sodium caseinate, whey, egg albumin, vegetable protein, or mixtures thereof.

15. The composition of claim 12 wherein the hydrophilic material is a polysaccharide selected from the group consisting of maltodextrin, corn syrup, carrageenan, sodium carboxymethylcellulose, xanthan gum, gum tragacanth, sodium alginate, high and low methoxyl pectins, gum agar, gum karaya, gum arabic, or mixtures thereof.

16. The composition of claim 12 wherein the hydrophilic material comprises milk solids.

17. The composition of claim 12 wherein the galactomannan gum is guar gum or locust bean gum.

18. The composition of claim 12 where the hydrophilic material is a monosaccharide selected from the group consisting of dextrose and fructose.

19. A composition comprising an aqueous medium having blended there 1.0-50.0 weight % of the composition of claim 16.

20. A process for preparing a composition which comprises forming an intimate admixture of the microcrystalline cellulose-galactomannan gum aggregate of claim 1 and a hydrophilic material, drying the resulting flocculate, and recovering water-dispersible spheroidal particles capable of forming a stable aqueous composition.

21. The process of claim 20 wherein the hydrophilic material is a polysaccharide selected from the group consisting of maltodextrin, corn syrup, carrageenen, sodium carboxymethylcellulose, xanthan gum, gum tragacanth, sodium alginate, high and low methoxyl pectins, gum agar, gum karaya, gum arabic, or mixtures thereof.

22. A process for preparing the composition of claim 12 wherein the adsorbed material is lipophilic, comprising emulsifying a lipophilic material with a surface active material, forming an aqueous slurry of the microcrystalline cellulose and galactomannan or aggregate thereof, intimately admixing the lipophilic material emulsion and slurry, and drying the mixture to recover water-dispersable spheroidal particles.

23. A process for preparing the composition of claim 12 wherein the adsorbed material is lipophilic, comprising dispersing the aggregate in an aqueous medium with agitation to obtain a uniform slurry, forming an emulsion of lipophilic material with a surface active material, uniformly admixing the emulsion and slurry, adding a proteinaceous material, and drying the mixture to recover water-dispersable spheroidal particles.

24. The process of claim 20 further comprising treating the mixture with a food grade acid prior to drying the resulting flocculate the acid being present in amounts sufficient to impart increased high energy shear resistance to the spheroidal particles.

25. The process of claim 24 wherein the amount of acid is sufficient to provide a pH of about 2.0 to 4.0.

26. A composition comprising an aqueous medium having blended therein about 1.0-50.0 weight % of the composition of claim 12.

27. A composition comprising an aqueous medium having blended therein about 1.0-15.0 weight % of the composition of claim 12.

28. A food composition comprising a foodstuff having incorporated therein the composition of claim 7 in amounts sufficient to simulate the physical and organoleptic properties of fat.

29. A method of imparting fat-like properties to a low calorie, aqueous based foodstuff which comprises intimately admixing the composition of claim 4 with a foodstuff in an aqueous medium, said composition being present in amounts sufficient to provide the foodstuff with fat-like characteristics.

30. A method of imparting fat-like properties to a low calorie, aqueous based foodstuff which comprises intimately admixing the composition of claim 12 with a foodstuff in an aqueous medium, said composition being present in amounts sufficient to provide the foodstuff with fat-like characteristics.

31. A composition comprising water dispersible, water-stable fibrous particles having an average particle size in the range of from about 0.5-30 microns, each particle consisting essentially of an aggregate of microcrystalline cellulose in the amount of about 60-85% by weight and a galactomannan gum in the amount of about 40-15% by weight, based on the total weight of the composition, which aggregate remains intact if dispersed in an aqueous medium.

32. The composition of claim 31 wherein the galactomannan gum is guar gum or locust bean gum.

33. A composition comprising an aqueous medium having blended therein about 1-50 wt. % of the composition of claim 31.

34. A process for preparing water-dispersible, water-stable, fibrous particles which comprises subjecting to high energy shear conditions an aqueous dispersion of a composition comprising substantially spheroidal-shaped particles having an average particle size in the range of about 0.1-100 microns, each particle consisting essentially of an aggregate of microcrystalline cellulose in the amount of about 60-85% by weight and a galactomannan gum in the amount of about 40-15% by weight, based on the weight of the composition, to obtain the corresponding fibrous particles having an average particle size of from about 0.5-30 microns.

35. The process of claim 34 wherein the galactomannan gum is guar gum or locust bean gum.

36. Water-soluble, water-dispersible, fibrous particles prepared in accordance with the process of claim 34.

37. The composition of claim 31 having adsorbed thereon a lipophilic or hydrophilic material, or combination thereof.

* * * * *

UNITED STATES PATENT AND TRADEMARK OFFICE
CERTIFICATE OF CORRECTION

PATENT NO. : 5,192,569
DATED : March 9, 1993
INVENTOR(S) : Emanuel J. McGinley and Domingo C. Tuason, Jr.

It is certified that error appears in the above-indentified patent and that said Letters Patent is hereby corrected as shown below:

Column 16, line 13, "70%" should read --70-99%--.
Column 16, line 14, "30%" should read --30-1%--.

Signed and Sealed this

Second Day of August, 1994

Attest:

BRUCE LEHMAN

*Attesting Officer*  *Commissioner of Patents and Trademarks*